United States Patent [19]
De Boer et al.

[11] 3,851,324
[45] Nov. 26, 1974

[54] NAVIGATIONAL REFERENCE INSTRUMENT

[75] Inventors: Albert De Boer; David I. Gleason, both of Grand Rapids, Mich.

[73] Assignee: R. C. Allen, Inc., Grand Rapids, Mich.

[22] Filed: June 18, 1973

[21] Appl. No.: 371,268

[52] U.S. Cl. ............ 340/267 R, 318/490, 318/564, 318/565, 340/29, 340/248 B, 340/263
[51] Int. Cl. .......................................... G08b 21/00
[58] Field of Search ............ 340/248 B, 263, 267 R, 340/27 NA, 29; 318/490, 563, 564, 565

[56] References Cited
UNITED STATES PATENTS

| | | | |
|---|---|---|---|
| 3,146,433 | 8/1964 | Hurlburt | 340/263 |
| 3,306,558 | 2/1967 | Overman et al. | 318/564 |
| 3,313,984 | 4/1967 | Hupp | 340/248 B |
| 3,334,342 | 8/1967 | Blackman | 340/263 |
| 3,401,549 | 9/1968 | Miller | 318/565 X |
| 3,550,104 | 12/1970 | Hashii et al. | 340/248 B |
| 3,651,402 | 3/1972 | Leffmann | 318/490 X |
| 3,696,363 | 10/1972 | Ljung | 340/248 B |
| 3,721,973 | 3/1973 | Sundberg et al. | 340/263 |

*Primary Examiner*—David L. Trafton
*Attorney, Agent, or Firm*—Lockwood, Dewey, Zickert & Alex

[57] ABSTRACT

An instrument for determining the rate of turn of a vehicle, and particularly marine craft, which includes a meter registering rate of turn responsive to a rate of turn gyroscope or gyro, and detector means sensing the speed of the gyroscope to produce an alarm signal when deterioration of gyro performance is detected before actual failure occurs because the speed is reduced below a given point.

8 Claims, 6 Drawing Figures

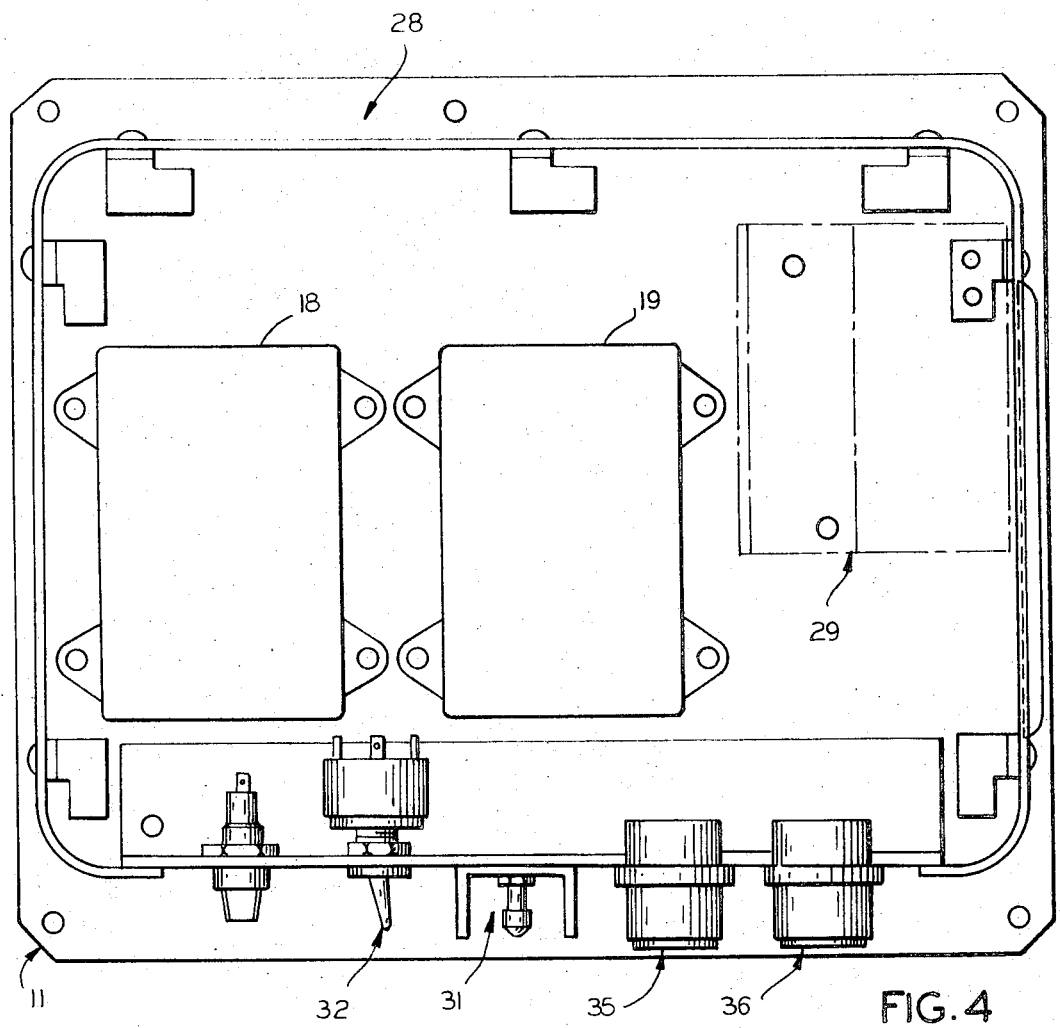
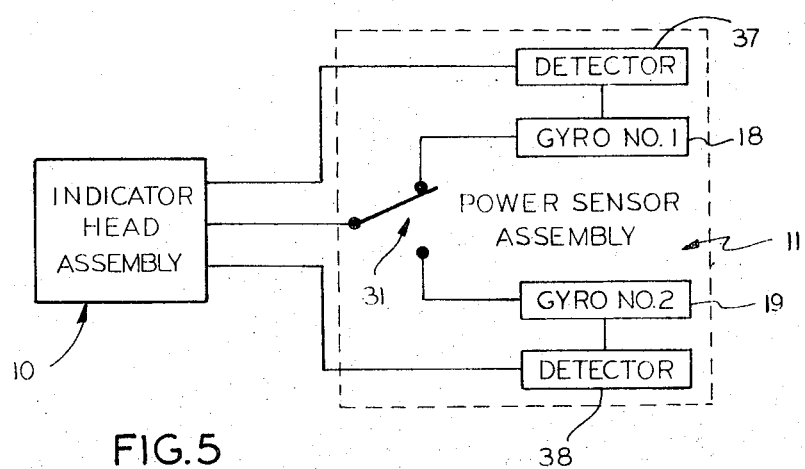
FIG.4
FIG.5

NAVIGATIONAL REFERENCE INSTRUMENT

This invention relates in general to a navigational reference instrument for indicating rate of turn of a vehicle and more particularly to a marine navigational reference instrument for indicating the rate of turn of marine craft traveling on water, and still more particularly to a marine rate-of-turn indicator for vessels navigating on inland waterways, such as tugboats pushing or pulling one or more barges, tankers, freighters, fishing trawlers, passenger ships and the like.

While the present invention will be generally described for use in the navigation of marine crafts along inland waterways, it should be appreciated that the invention could be used on other vehicles to advantage, such as ships at sea and aircraft. The problem for which the present invention is especially intended to solve concerns inland waterway navigation of marine workboats and particularly tugboats pushing or pulling one or more barges. For example, a tugboat pushing a string of two or more barges ahead will encounter yaw motion because of current, wind and steering conditions that may result in traversing a path back and forth across a waterway which obviously requires a time element that would be greater than if the tugboat could follow a straight path in the waterway. Over a long distance such as between Minnesota and Texas, the savings in navigation time by maintaining a proper and straight course heading can be significant and economically advantageous. Exemplary of this is a test conducted with the present invention between Minnesota and Texas wherein 48 hours of navigation time was saved over navigating with heretofore known instruments. While the broad idea of using a gyroscopic rate-of-turn device for marine navigation is known, heretofore known units have not been sufficiently reliable to render them economically feasible. In this connection it must be appreciated that a reliable instrument must be free of maintenance requirements for long periods of time as maintenance skills and facilities for such an instrument are available only on a limited basis, such as perhaps at no more than several hundred mile intervals along a waterway. Instruments of this type heretofore known have included only a single rate-of-turn gyroscopic or rate gyro which, upon failure, results in complete shutdown of the instrument, which shutdown cannot be corrected until a service station has been reached.

The marine navigational reference instrument of the present invention is unique in that it includes a plurality of rate gyros, and particularly a pair of rate gyros, wherein the malfunctioning of one rate gyro will not cause complete shutdown of the instrument inasmuch as the other gyro can then be used and the first gyro can be repaired or replaced at a convenient time to once again provide the safeguard of having a back-up gyro to avoid downtime of the instrument and loss of navigation time on any one trip.

Heretofore gyroscopic marine rate-of-turn indicators have not included any warning system for alerting the operator to a failure of the gyro which may cause substantial off-course direction and loss of time before failure is noted. The present invention overcomes this difficulty by providing means for detecting gyro failure through the measurement of the speed of the gyro motor, and where a plurality of gyros are provided, so that the detection of failure of the gyro being used alerts the operator to cut in the backup gyro and thereby eliminate downtime of the instrument.

The instrument of the present invention includes an indicator head assembly and a power sensor assembly. The indicator head assembly includes a meter registering rate of turn, and indication means for detecting gyro failure, and is preferably positioned on the craft where it may be readily seen by the helmsman. The power sensor assembly may be remotely located from the indicator head assembly and interconnected therewith by cable. Further, the power sensor assembly includes one and preferably at least two rate gyros, together with a speed indicator means for each gyro, the latter of which is connected to the gyro failure warning indication on the indicator head assembly. Switching means is provided on the power sensor assembly although it could be incorporated in the indicator head assembly for switching power to one of the gyros and at the same time interconnecting that gyro with the meter on the indicator head assembly. Accordingly, when the indication on the power head assembly shows the gyro on line failing, the auxiliary or back-up gyro may be cut in to avoid any downtime of the instrument and time-consuming faulty navigation. Thereafter, the faulty gyro may be repaired or replaced to provide a back-up for the gyro that is good.

Accordingly, it is an object of the present invention to provide a new and improved navigation instrument for craft and especially marine craft.

Another object of this invention is in the provision of a new and improved marine navigational reference instrument including a rate-of-turn meter driven by a rate gyro and means for detecting the speed of the gyro and therefore the point of time when the gyro is failing.

A still further object of this invention is in the provision of a marine rate-of-turn indicator including a rate-of-turn meter selectively driven by one of a plurality of rate gyros wherein detector means is provided to sense the failing of a gyro so that a backup gyro can be cut in, thereby eliminating downtime of the instrument.

Other objects, features and advantages of the invention will be apparent from the following detailed disclosure, taken in conjunction with the accompanying sheets of drawings, wherein like reference numerals refer to like parts, in which:

FIG. 4 is a top plan view of the power sensor assembly with a portion of the housing cut away to show the arrangement of underlying parts;

FIG. 5 is a block diagram of the instrument according to the invention; and

Figure 1:
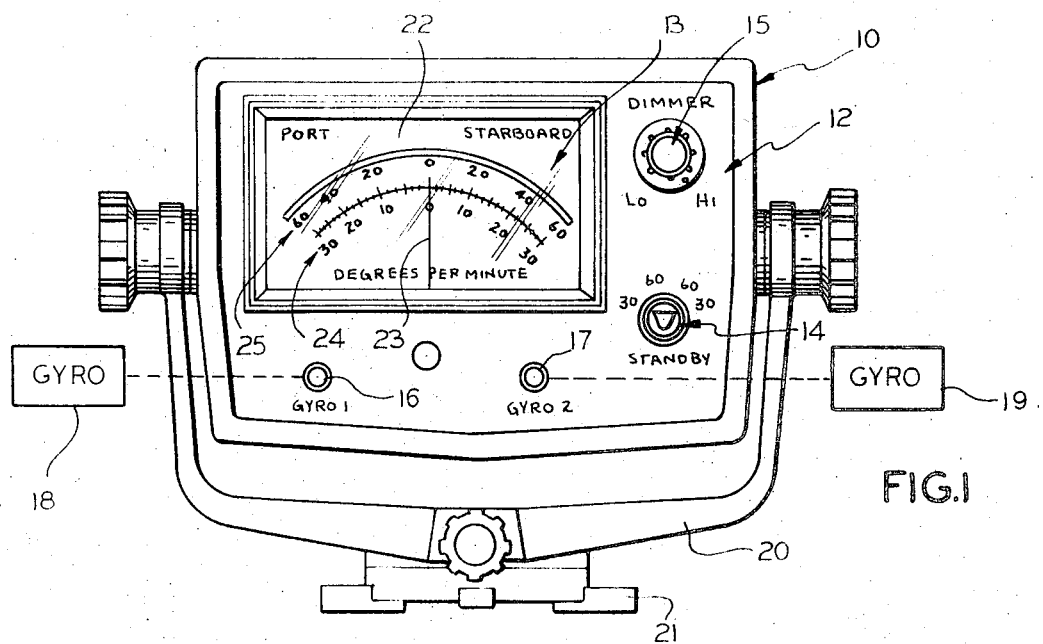
FIG. 1 is a front elevational view of the indicator head assembly of the instrument according to the invention.
Figure 3:
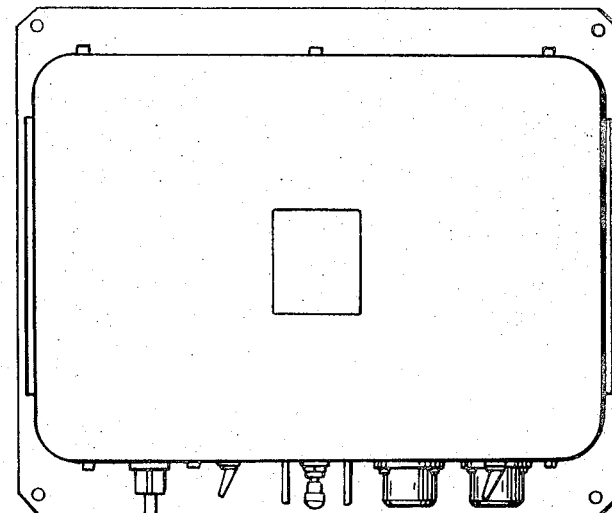
FIG. 3 is a top plan view of the power sensor assembly.
Figure 2:
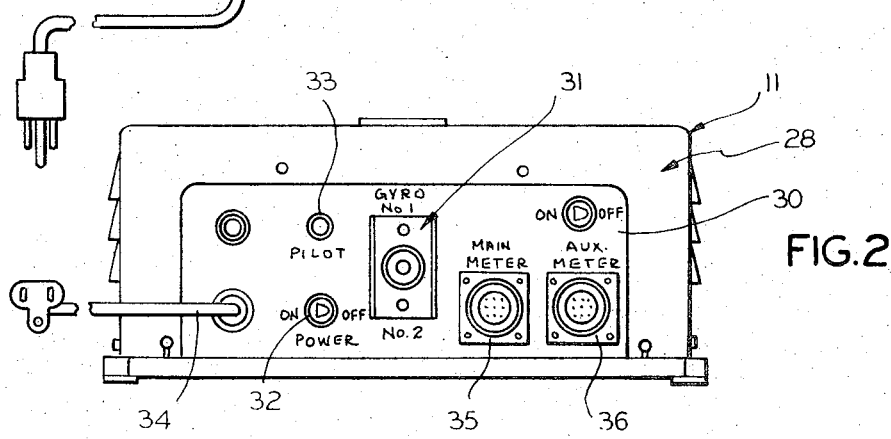
FIG. 2 is a front elevational view of the power sensor assembly of the instrument according to the invention.

The rate-of-turn indicator of the present invention is illustrated in the drawings as especially useful for navigating marine craft but also could be utilized in navigating aircraft or land craft. With respect to marine craft and especially work boats hauling, pushing or pulling a load, the rate-of-turn indicator is capable of sensing and illustrating a turn rate change as low as 0.002° per second. The exceptionally high sensitivity gives the operator of the craft the information needed to accurately maneuver the most heavily loaded vessels with ease and confidence.

Referring now to the drawings and particularly to FIGS. 1 to 5, the indicator of the invention includes generally an indicator head assembly 10 and power sensor assembly 11. The indicator head assembly may be mounted wherever desired in the operating cabin of the craft where it can be quickly and easily observed during the steering of the craft so that when yawing is taking place and observed by the indicator, it can be quickly and easily corrected, thereby eliminating unnecessary and time-consuming zig-zag maneuvering along the waterway.

The indicator head assembly 10, as seen in FIG. 1, includes a dash or instrument face 12 having a rate-of-turn meter 13, a sensitivity switch 14, a light intensity potentiometer 15 controlling the illumination intensity of the meter 13, and warning lights 16 and 17 for the gyros 18 and 19 which are remotely located in the power sensor assembly 11. As illustrated, the indicator head assembly is mounted for pivotal movement along a horizontal axis in a forked bracket 20 having a mounting flange 21 which may be secured to a deck surface. It should be appreciated that any other type of mounting arrangement may be provided for the indicator head and as such it provides no part of the present invention.

The rate-of-turn meter 13 responds to the gyro in the power sensor assembly that is energized and connected to it, and the meter includes a face 22 having appropriate indicia imprinted thereon and a needle 23 responding to the rate-of-turn information provided by the gyro connected to the meter. While the meter face is preferably color-coded red and green for port and starboard reference, it should be appreciated it could be otherwise displayed to assist in reading by an operator. The scale on the face includes increments of 1.0° per minute (0.06° per second) for each graduation up to the full scale rate of 30° per minute (0.5° per second) along the indicia 24. The threshold and resolution of the system is such that turn rate changes as low as 0.002° per second can readily be observed on the meter where the meter needle can be seen to swing either side of the zero reference point. When operating with smaller loads and higher turn rates, the actuation of the sensitivity switch 14 reduces the sensitivity in half to read 2.0° per minute for each graduation up to 60° per minute full scale along the scale 25. For operation during no load conditions or other times when rate-of-turn information is not required, a sensitivity switch may be moved to a standby position to deactivate the meter. It should be further appreciated that any scale may be provided on the meter face depending upon the needs of the installation and that the illustrated scales are illustrative of what is believed to be satisfactory to the marine work boat industry.

The power sensor assembly 11, FIG. 4, includes a housing 28 within which is mounted the first and second gyros 18 and 19, together with solid state circuitry 29 for converting the ship's power to provide the gyro motor drive requirements. A phase sensitive demodulator in the form of solid state circuitry is self-contained within each gyro. This circuitry converts the rate-of-turn signal of the operating gyro which is in the form of an A.C. signal into a D.C. voltage with a magnitude and polarity proportional to the rate and direction of any rotation about the sensitive axis of the gyro. The portion of the solid state circuitry relating to the phase-sensitive demodulator and the power amplifier for driving the turn rate meter is not shown and forms no part of the invention as it can be appreciated that the signal from the gyros can be converted to a readable indication on the meter in any suitable manner. Preferably, the pick off of the gyro is of the non-contacting electromagnetic, photo-optical or other type for longest possible life.

Figure 6:
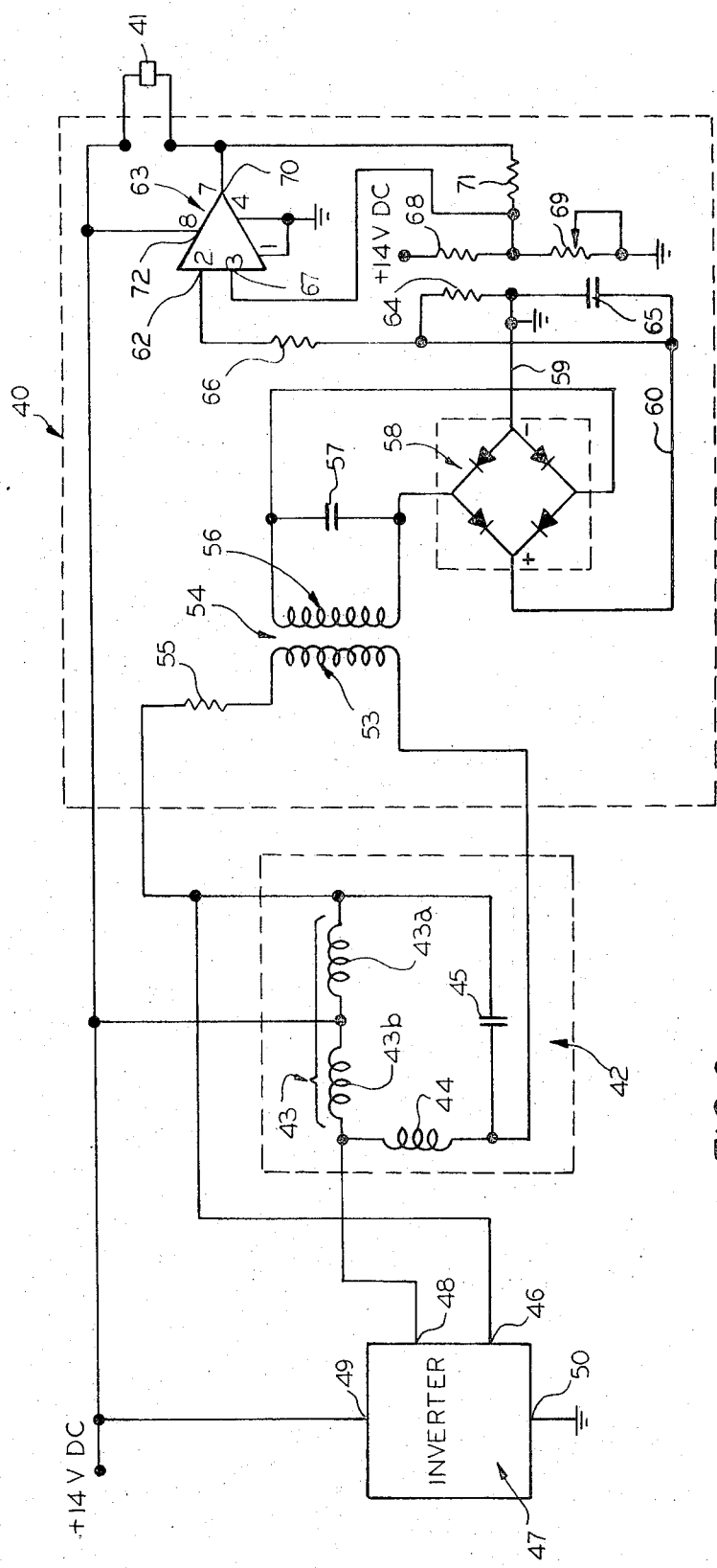
FIG. 6 is an electrical schematic diagram of a rate gyro motor and speed detection device according to the present invention.

The gyro motors are of the brushless A.C. induction type or squirrel cage induction type, the electrical schematics of which are shown in FIG. 6. In the interests of extending operational life to a maximum value, the motor is designed to operate at about 7,000 rpm from a 400 Hz voltage supply.

The housing 28 of the power sensor assembly includes a connection and control panel 30 on which a gyro selector switch 31 is mounted. The controlling panel also includes an on-off power switch 32, a pilot light 33 indicating "on" condition, a power cord 34 for connection to the ship's 115 volt, 60 Hz power which is converted to provide a 14 volt D.C. supply to the gyro, a main meter connector 35 for connection between the indicator head assembly 10 and the power sensor assembly, and an auxiliary meter connector 36 for connection to an auxiliary meter if so desired to operate at the same time with the main meter. Accordingly, it can be appreciated that the power sensor assembly can be mounted remotely from the indicator head assembly.

The built-in warning system for detecting deterioration of gyro performance before actual failure occurs includes detectors 37 and 38, respectively, for the gyros 18 and 19. Accordingly, deterioration of gyro 18, if it is operating in the system, will be detected by the detector 37 and illuminate the warning light 16 on the instrument face of the indicator head assembly. The operator may then simply flip the gyro selection switch 31 to the alternate position to activate the gyro 19 and connect it into the system to provide uninterrupted operation of the system. Thereafter, at a convenient time, the malfunctioning gyro can be repaired or replaced at any convenient service center. Similarly, if gyro 19 was being used and deterioration was noted by illumination of the warning light 17, the gyro selector switch may be operated to activate and connect in the gyro 18. It should further be appreciated that while only two gyros are illustrated in the power sensor assembly any number may be provided for back-up purposes.

The sensing or detection circuit, which detects the speed of the gyro connected to the rate-of-turn meter to alert to the failure of the gyro so that the power to it and the connection of it to the meter may be interrupted and the auxiliary gyro may be energized and connected to the meter, is schematically illustrated in FIG. 6. The detection circuit, one of which is provided for each of the gyros, is generally indicated by the numeral 40 which functions to compare the voltage on the phase-splitting capacitor of the motor to a reference voltage and cause operation of a warning light in the form of a light-emitting device 41 when the speed of the gyro motor falls below a predetermined level. The voltage level of the capacitor is proportional to the motor speed. Means other than a phase-splitting capaciitor may be employed to provide a motor speed voltage.

The gyro motor circuit is generally designated by the numeral 42 and includes a primary winding 43 and a secondary winding 44. A phase-splitting capacitor 45 is connected in series with winding 44. One end of the primary winding 43 is connected to an output 46 of a power supply inverter 47 while the other end of the primary winding is connected in common to one end of the secondary winding and the output 48 of power supply 47. The inverter is connected to a +14 volt D.C. supply at its input 49 and another section of the inverter is connected to ground at 50. The inverter functions to alternately connect outputs 46 and 48 to ground at a 400 cycle rate, thereby alternately applying 14 volts across the primary winding sections 43a and 43b supplying a 400 cycle potential to the gyro motor. While the motor 42 is of the squirrel cage induction type, it is designed for an 8,000 sync rating, but since the squirrel cage slips, the motor runs at between 6,200 and 7,200 rpm. The type of motor employed is immaterial as the detecting circuit illustrated herein is intended to measure the voltage across the phase-splitting capacitor to determine motor speed. It should be recognized that other types of motor speed detectors can be employed which will produce a signal proportional to the motor speed.

The voltage level across the phase-splitting capacitor 45, the magnitude of which is directly proportional to the speed of the gyro motor, is connected to the input winding 53 of an isolation transformer 54. A current limiting resistor 55 is connected in series with the input winding. The signal from the output winding 56 of the transformer is wave-shaped by a capacitor 57 connected in parallel to the winding before it is rectified by a full-wave rectifier 58. A pulsating D.C. signal is taken from the output lines 59 and 60 of the rectifier and delivered to the input 62 of a comparator amplifier 63.

The signal at the input 62 of the amplifier 63 represents the voltage measured across the phase-splitting capacitor 45 of the gyro motor. The output of the rectifier 58 is filtered by means of a resistor 64 and a capacitor 65, and a current limiting resistor 66 is in series with the output of the rectifier as it is delivered to input 62 of the amplifier.

A D.C. reference voltage is produced and delivered to the other input 67 of the amplifier. This reference voltage is generated by a voltage divider including a fixed resistor 68 and a variable resistor or potentiometer 69 connected in series and across the +14 volt D.C. supply. The reference voltage is taken from the common of the resistor 68 and the potentiometer 69 and can be adjusted to whatever level desired by the potentiometer 69. When the voltage at input 62 which is proportional to the voltage across the phase-splitting capacitor 45 of the motor drops below the reference voltage at input 67, the output terminal 70 of the amplifier is effectively at ground potential providing a low impedance current path to ground for the light emitting diode 41. Thus, the speed at which deterioration of gyro performance occurs can be programmed into the comparator amplifier by adjustment of the reference voltage.

The light-emitting device 41, when turned on by the amplifier 63, is powered by the 14 volt D.C. voltage working through the amplifier to ground. One side of the warning light 41 is connected to the output terminal 70 of the amplifier, while the other side is connected to the 14 volt power supply. Therefore, the comparator amplifier 63 functions to cause the warning light 41 to be brightly energized when the critical speed level of the gyro motor is detected as being inadequate or nearly inadequate to provide stable operation. When the activated gyro is seen to be deteriorating by the illumination of the warning light on the indicator head assembly, the gyro can be deactivated and disconnected from the rate-of-turn meter by operation of the selector switch 31, and the back-up gyro can be activated and connected to the meter to avoid interrupted operation of the indication system.

The identification of components for the circuitry which provides a satisfactory operation but which is not intended to limit the circuit to any specific values and components is in accordance with the following table:

| Component Number | Component Identification | Value |
| --- | --- | --- |
| 41 | Incadescent Lamp | CM-1893 |
| 45 | Capacitor | 4 microfarads |
| 54 | Transformer | DI-T265 |
| 55 | Resistor | 13 K ohms |
| 57 | Capacitor | .047 microfarads |
| 58 | Rectifier | MDA 920A-4 |
| 63 | Amplifier | National Semi-Conductor LM 311 |
| 64 | Resistor | 430 K ohms |
| 65 | Capacitor | .39 microfarads |
| 66 | Resistor | 1 K ohm |
| 68 | Resistor | 1 K ohm |
| 69 | Potentiometer | 2 K ohm |
| 71 | Resistor | 180 K ohms |

It will be understood that modifications and variations may be effected without departing from the scope of the novel concepts of the present invention, but it is understood that this application is to be limited only by the scope of the appended claims.

The invention is hereby claimed as follows:

1. A marine navigational reference instrument comprising a rate gyro, a meter responsive to said gyro indicating rate of turn, and detector means sensing the speed of the gyro and producing a warning signal when the speed is below a given point, wherein the gyro includes a squirrel cage induction motor having primary and secondary windings, said primary winding being center-tapped, means supplying a D.C. potential alternately across each half thereof, and a phase-splitting capacitor connected in series with the secondary winding, and wherein the detector means includes means producing a reference voltage, and a comparator amplifier receiving as one input a signal produced from the voltage across the phase-splitting capacitor and as another input a signal produced by said reference voltage, said amplifier producing an output when the input voltage from the phase-splitting capacitor is less than the reference voltage.

2. A marine navigational reference instrument comprising a rate gyro, a meter responsive to said gyro indicating rate of turn, and detector means sensing the speed of the gyro and producing a warning signal when the speed is below a given point, wherein the gyro includes a squirrel cage induction motor having a primary and secondary windings, said primary winding being center-tapped, means supplying a D.C. potential alternately across each half thereof, and a phase-splitting capacitor connected in series with the secondary winding, and wherein the detector means includes means producing a D.C. reference voltage, means for rectifying the voltage across the phase-splitting capacitor to produce a D.C. voltage representing motor speed, a comparator amplifier receiving as one input the speed voltage and as another input the reference voltage to compare the voltages and produce an output signal when the speed voltage is less than the reference voltage, and indicator means responsive to the output of the comparator amplifier.

3. A marine navigational reference instrument comprising a plurality of rate gyros, a detector means for each gyro sensing the speed thereof and producing a signal when the speed is below a given point, a gyro responsive meter indicating rate of turn, and switching means for selectively connecting one gyro to the meter, wherein each gyro includes a squirrel cage induction motor having primary and secondary windings, said primary winding being center-tapped, means supplying a D.C. potential alternately across each half thereof, and a phase-splitting capacitor connected in series with the secondary winding, and wherein each detector means includes means producing a reference voltage, and a comparator amplifier receiving as one input a signal produced from the voltage across the phase-splitting capacitor and as another input a signal produced by said reference voltage, said amplifier producing an output when the signal voltage from the phase-splitting capacitor is less than the reference voltage.

4. A marine navigational reference instrument comprising a plurality of rate gyros, a detector means for each gyro sensing the speed thereof and producing a signal when the speed is below a given point, a gyro responsive meter indicating rate of turn, and switching means for selectively connecting one gyro to the meter, wherein each gyro includes a squirrel cage induction motor having primary and secondary windings, said primary winding being center-tapped, means supplying a D.C. potential alternately across each half thereof, and a phase-splitting capacitor connected in series with the secondary winding, and wherein each detector means includes means producing a D.C. reference voltage, means for rectifying the voltage across the phase-splitting capacitor to produce a D.C. voltage representing motor speed, a comparator amplifier receiving as one input the speed voltage and as another input the reference voltage to compare the voltages and produce an output signal when the speed voltage is less than the reference voltage, and indicator means responsive to the output of the comparator amplifier.

5. A marine navigational reference instrument comprising an indicator head assembly and a power sensor assembly remotely located therefrom and interconnected therewith, said power sensor assembly including a rate gyro, and detector means for sensing the speed of the gyro to produce a signal when the speed is below a given point, said indicator head assembly including a meter responsive to said gyro indicating rate of turn, and signal means responsive to said detector means, wherein the gyro includes a squirrel cage induction motor having primary and secondary windings, said primary winding being center-tapped, means supplying a D.C. potential alternately across each half thereof, and a phase-splitting capacitor connected in series with the secondary winding, and wherein the detector means includes means producing a reference voltage, and a comparator amplifier receiving as one input a signal produced from the voltage level across the phase-splitting capacitor and as another input a signal produced by said reference voltage, said amplifier producing an output when the voltage level from the phase-splitting capacitor drops below a given point.

6. A marine navigational reference instrument comprising an indicator head assembly and a power sensor assembly remotely located therefrom and interconnected therewith, said power sensor assembly including a rate gyro, and detector means for sensing the speed of the gyro to produce a signal when the speed is below a given point, said indicator head assembly including a meter responsive to said gyro indicating rate of turn, and signal means responsive to said detector means, wherein the gyro includes a squirrel cage induction motor having primary and secondary windings, said primary winding being center-tapped, means supplying a D.C. potential alternately across each half thereof, and a phase-splitting capacitor connected in series with the secondary winding, and wherein the detector means includes means producing a D.C. reference voltage, means for rectifying the voltage across the phase-splitting capacitor to produce a D.C. voltage representing motor speed, a comparator amplifier receiving as one input the speed voltage and as another input the reference voltage to compare the voltages and produce an output signal when the speed voltage is less than the reference voltage, and indicator means responsive to the output of the comparator amplifier.

7. A marine navigational reference instrument comprising an indicator head assembly and a power sensor assembly remotely located therefrom and interconnected therewith, said power sensor assembly including a plurality of rate gyros, and detector means for each gyro to sense the speed thereof and to produce a signal when the speed is below a given point, said indicator head assembly including a gyro responsive meter indicating rate of turn, and signal means responsive to the detector means of each gyro, and switching mean on one of said assemblies for selectively energizing and connecting one of the gyros to said meter, wherein each gyro includes a squirrel cage induction motor having primary and secondary windings, said primary winding being center-tapped, means supplying a D.C. potential alternately across each half thereof, and a phase-splitting capacitor connected in series with the secondary winding, and wherein each detector means includes means producing a reference voltage, and a comparator amplifier receiving as one input a signal produced from the voltage level across the phase-splitting capacitor and as another input a signal produced by said reference voltage, said amplifier producing an output when the voltage level from the phase-splitting capacitor drops below a given point.

8. A marine navigational reference instrument comprising an indicator head assembly and a power sensor assembly remotely located therefrom and interconnected therewith, said power sensor assembly including a plurality of rate gyros, and detector means for each gyro to sense the speed thereof and to produce a signal when the speed is below a given point, said indicator head assembly including a gyro responsive meter indicating rate of turn, and signal means responsive to the detector means of each gyro, and switching means on one of said assemblies for selectively energizing and connecting one of the gyros to said meter, wherein each gyro includes a squirrel cage induction motor having primary and secondary windings, said primary winding being center-tapped, means supplying a D.C. potential alternately across each half thereof, and a phase-splitting capacitor connected in series with the secondary winding, and wherein each detector means includes means producing a D.C. reference voltage, means for rectifying the voltage across the phase-splitting capacitor to produce a D.C. voltage representing motor speed, a comparator amplifier receiving as one input the speed voltage and as another input the reference voltage to compare the voltages and produce an output signal when the speed voltage is less than the reference voltage, and indicator means responsive to the output of the comparator amplifier.

* * * * *